(12) United States Patent
Johnson et al.

(10) Patent No.: US 12,083,681 B2
(45) Date of Patent: *Sep. 10, 2024

(54) ROBOT CONGESTION MANAGEMENT

(71) Applicant: Locus Robotics Corp., Wilmington, MA (US)

(72) Inventors: Michael Charles Johnson, Ashland, MA (US); Luis Jaquez, Burlington, MA (US); Sean Johnson, Danvers, MA (US); Andrew Alcutt, Andover, MA (US)

(73) Assignee: Locus Robotics Corp., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,605

(22) Filed: Mar. 7, 2023

(65) Prior Publication Data

US 2023/0202042 A1 Jun. 29, 2023

Related U.S. Application Data

(63) Continuation of application No. 16/265,703, filed on Feb. 1, 2019, now Pat. No. 11,724,395.

(51) Int. Cl.
*B25J 9/16* (2006.01)
*B25J 9/00* (2006.01)

(52) U.S. Cl.
CPC ........... *B25J 9/1666* (2013.01); *B25J 9/0084* (2013.01); *B25J 9/1661* (2013.01)

(58) Field of Classification Search
CPC ....... B25J 9/1666; B25J 9/0084; B25J 9/1661
See application file for complete search history.

(56) References Cited

U.S. PATENT DOCUMENTS 8,326,679 B1 12/2012 Rowe et al.
8,983,647 B1 3/2015 Dwarakanath et al.
(Continued)

FOREIGN PATENT DOCUMENTS

WO 2018/132793 A1 7/2018

OTHER PUBLICATIONS

International Searching Authority/EP, International Search Report and Written Opinion of the International Searching Authority, Application No. PCT/US2021/049239, dated Nov. 22, 2021; 15 pages.
(Continued)

*Primary Examiner* — Jaime Figueroa
*Assistant Examiner* — Mohamad O El Sayah
(74) *Attorney, Agent, or Firm* — Sunstein LLP

(57) ABSTRACT

Systems and methods are provided for robot congestion management including a robot monitoring server configured to track a location of a plurality of robots within a navigational space and a plurality of robots in communication with the robot monitoring server, each robot including a processor and a memory, the memory storing instructions that, when executed by the processor, cause the autonomous robot to determine, from a task list assigned to the robot, a first pose location corresponding to a first task, receive, from the robot monitoring server, congestion information associated with the first pose location, identify a congested state of the first pose location indicated by the congestion information, select, responsive to the identification of the congested state, a second task from the task list, and navigate to a second pose location corresponding to the second task.

1 Claim, 11 Drawing Sheets

(56) References Cited

U.S. PATENT DOCUMENTS

| | | |
|---|---|---|
| 9,346,620 B2 | 5/2016 | Brunner et al. |
| 9,463,927 B1 | 10/2016 | Theobald |
| 9,776,324 B1 | 10/2017 | Johnson et al. |
| 9,829,333 B1 | 11/2017 | Calder |
| 10,022,867 B2 | 7/2018 | Saboo et al. |
| 10,296,995 B2 | 5/2019 | Saboo et al. |
| 10,414,052 B2 | 9/2019 | Deyle et al. |
| 10,513,033 B2 | 12/2019 | Johnson et al. |
| 10,562,707 B1 | 2/2020 | Wise et al. |
| 2005/0216294 A1 | 9/2005 | Labow |
| 2007/0192910 A1 | 8/2007 | Vu et al. |
| 2008/0215179 A1 | 9/2008 | Yair et al. |
| 2010/0296908 A1 | 11/2010 | Ko |
| 2011/0200420 A1 | 8/2011 | Driskill et al. |
| 2012/0152877 A1 | 6/2012 | Tadayon |
| 2012/0330458 A1 | 12/2012 | Weiss |
| 2013/0317642 A1 | 11/2013 | Asaria et al. |
| 2014/0100715 A1 | 4/2014 | Mountz et al. |
| 2014/0136255 A1 | 5/2014 | Grabovski et al. |
| 2015/0088310 A1 | 3/2015 | Pinter et al. |
| 2015/0360865 A1 | 12/2015 | Massey |
| 2015/0367513 A1 | 12/2015 | Gettings et al. |
| 2016/0101940 A1 | 4/2016 | Grinnell et al. |
| 2017/0032306 A1 | 2/2017 | Johnson et al. |
| 2017/0274531 A1* | 9/2017 | Johnson ................ B25J 9/1666 |
| 2017/0278047 A1 | 9/2017 | Welty et al. |
| 2017/0285648 A1 | 10/2017 | Welty et al. |
| 2017/0286916 A1 | 10/2017 | Skiba et al. |
| 2018/0029797 A1 | 2/2018 | Hance et al. |
| 2018/0043533 A1 | 2/2018 | Johnson et al. |
| 2018/0059635 A1 | 3/2018 | Johnson et al. |
| 2018/0108102 A1 | 4/2018 | Kapuria |
| 2018/0103015 A1 | 5/2018 | Jones et al. |
| 2018/0201444 A1 | 7/2018 | Welty et al. |
| 2018/0239343 A1 | 8/2018 | Voohries et al. |
| 2018/0300798 A1 | 10/2018 | Rajkhowa et al. |
| 2018/0370728 A1 | 12/2018 | Gallagher et al. |
| 2019/0094866 A1 | 3/2019 | Moore et al. |
| 2019/0138978 A1 | 5/2019 | Johnson et al. |
| 2020/0033867 A1 | 1/2020 | Grant et al. |
| 2020/0061839 A1 | 2/2020 | Deyle et al. |
| 2020/0089237 A1 | 3/2020 | Whitaker |
| 2020/0202285 A1 | 6/2020 | Elazary et al. |
| 2020/0239231 A1 | 7/2020 | Johnson et al. |
| 2020/0246978 A1 | 8/2020 | Johnson et al. |
| 2020/0275984 A1 | 9/2020 | Brisson et al. |
| 2020/0278667 A1 | 9/2020 | Voorhies et al. |
| 2021/0154840 A1* | 5/2021 | Vogel ................... B25J 9/1666 |

OTHER PUBLICATIONS

Rule et al., Designing interfaces for multi-user, multi-robot systems, 2012, IEEE, pp. 97-104.

Shiomi et al., Field trial of networked social robots in a shopping mall, 2009, IEEE, pp. 2846-2853.

Hughes et al., Camera orientation: an opportunity for human-robot collaborative control, 2005, IEEE, pp. 1-6.

Trouvain et al., Comparison of a map-vs. camera-based user interface in a multi-robot navigation task, 2003, IEEE, pp. 3224-3231.

International Searching Authority/EP, International Search Report and Written Opinion of the International Searching Authority, Application No. PCT/US2020/016055, mailed Mar. 30, 2020, 13 pages.

International Searching Authority/EP, International Search Report and Written Opinion of the International Searching Authority, Application No. PCT/US2020/015811, mailed Apr. 1, 2020, 11 pages.

International Searching Authority/EP, International Search Report and Written Opinion of the International Searching Authority, Application No. PCT/US2020/016193, mailed Mar. 31, 2020, 11 pages.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

ROBOT CONGESTION MANAGEMENT

CROSS-REFERENCE TO RELATED APPLICATION

This application is a continuation of U.S. patent application Ser. No. 16/265,703, filed Feb. 1, 2019, titled "ROBOT CONGESTION MANAGEMENT." The disclosure of this application is hereby incorporated by reference in its entirety.

TECHNICAL FIELD

This invention relates to robot navigation and more particularly to robot congestion management.

BACKGROUND ART

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

To the extent that a plurality of robots and human operators concurrently navigate through shared spaces in a warehouse, multiple robots, as well as human operators seeking to assist them, can approach a similar location, causing both robot and human traffic congestion. For example, during an order fulfillment operation, a popular consumer item may cause robots to converge on a common location or aisle, creating congestion, causing inefficient delays, and increasing collision risk. Additionally, when many robots are clustered in discrete locations, human operators may also tend to cluster in those areas in order to execute the picks associated with those robots, thereby exacerbating the congestion issue. Furthermore, because many of the robots and human operators are clustered, robots operating in less active portions of the warehouse can be left unassisted by human operators for extended periods of time, thus causing increased dwell time for those robots, thereby further reducing efficiency.

SUMMARY OF THE EMBODIMENTS

Provided herein are systems and methods for robot collision avoidance using proximity beacons.

In one aspect, a robot congestion management system is provided. The system includes a robot monitoring server configured to track a location of a plurality of robots within a navigational space. The system also includes a plurality of robots in communication with the robot monitoring server. Each robot includes a processor. Each robot also includes a memory. The memory stores instructions that, when executed by the processor, cause the autonomous robot to determine, from a task list assigned to the robot, a first pose location corresponding to a first task. The memory also stores instructions that, when executed by the processor, cause the autonomous robot to receive, from the robot monitoring server, congestion information associated with the first pose location. The memory also stores instructions that, when executed by the processor, cause the autonomous robot to identify a congested state of the first pose location indicated by the congestion information. The memory also stores instructions that, when executed by the processor, cause the autonomous robot to select, responsive to the identification of the congested state, a second task from the task list. The memory also stores instructions that, when executed by the processor, cause the autonomous robot to navigate to a second pose location corresponding to the second task.

In some embodiments, the second task is selected in response to one or more efficiency factors, including the second pose location being in a non-congested state, at least one human operator being detected proximate the second pose location, the second task being a next sequential task on the task list, the second task being a next highest priority task on the task list, proximity of the second task to the first task, or combinations thereof. In some embodiments, the congested state is identified in response to one or more congestion conditions described by the congestion information associated with the pose location, including one or more of a number of other robots, a number of human operators, a combined number of robots and human operators, a number of manually disabled robots, a number and type of non-robot, non-human objects, vehicles, or other obstructions, dimensions of the navigational space, or combinations thereof. In some embodiments, the memory also stores instructions that, when executed by the processor, cause the autonomous robot to re-insert the first task into the task list after the second task such that the robot navigates to the first pose location before completion of the task list. In some embodiments, the robot monitoring server further comprises one or more of a warehouse management system, an order-server, a standalone server, a distributed system comprising the memory of at least two of the plurality of robots, or combinations thereof. In some embodiments, the navigational space is a warehouse. In some embodiments, the second task is at least one of a pick operation, a put operation, or combinations thereof to be executed within the warehouse.

In another aspect, a method for robot congestion management is provided. The method includes tracking, by a robot monitoring server, a location of a plurality of autonomous robots within a navigational space. The method also includes determining, in a memory and a processor of one of the plurality of autonomous robots, from a task list assigned to the robot, a first pose location corresponding to a first task. The method also includes receiving, from the robot monitoring server by a transceiver of the autonomous robot, congestion information associated with the first pose location. The method also includes identifying a congested state of the first pose location indicated by the congestion information. The method also includes selecting, responsive to the identification of the congested state, a second task from the task list. The method also includes navigating to a second pose location corresponding to the second task.

In some embodiments, the method also includes selecting the second task in response to one or more efficiency factors, including the second pose location being in a non-congested state, at least one human operator being detected proximate the second pose location, the second task being a next sequential task on the task list, the second task being a next highest priority task on the task list, proximity of the second task to the first task, or combinations thereof. In some embodiments, the method also includes identifying the congested state in response to one or more congestion conditions described by the congestion information associated with the pose location, including one or more of a number of other robots, a number of human operators, a combined number of robots and human operators, a number of manually disabled robots, a number and type of non-robot, non-human objects, vehicles, or other obstructions, dimensions of the navigational space, or combinations thereof. In some embodiments, the method also includes re-inserting the first task into the task list after the second task such that the robot navigates to the first pose location before completion of the task list. In some embodiments, the robot monitoring server includes one or more of a warehouse management system, an order-server, a standalone server, a distributed system comprising the memory of at least two of the plurality of robots, or combinations thereof. In some embodiments, the navigational space is a warehouse. In some embodiments, the second task is at least one of a pick operation, a put operation, or combinations thereof to be executed within the warehouse.

These and other features of the invention will be apparent from the following detailed description and the accompanying figures, in which:

BRIEF DESCRIPTION OF THE DRAWINGS

FIG. 6 is a table of the fiducial identification to pose mapping;

FIG. 7 is a table of the bin location to fiducial identification mapping;

DETAILED DESCRIPTION OF SPECIFIC EMBODIMENTS

Figure 1:
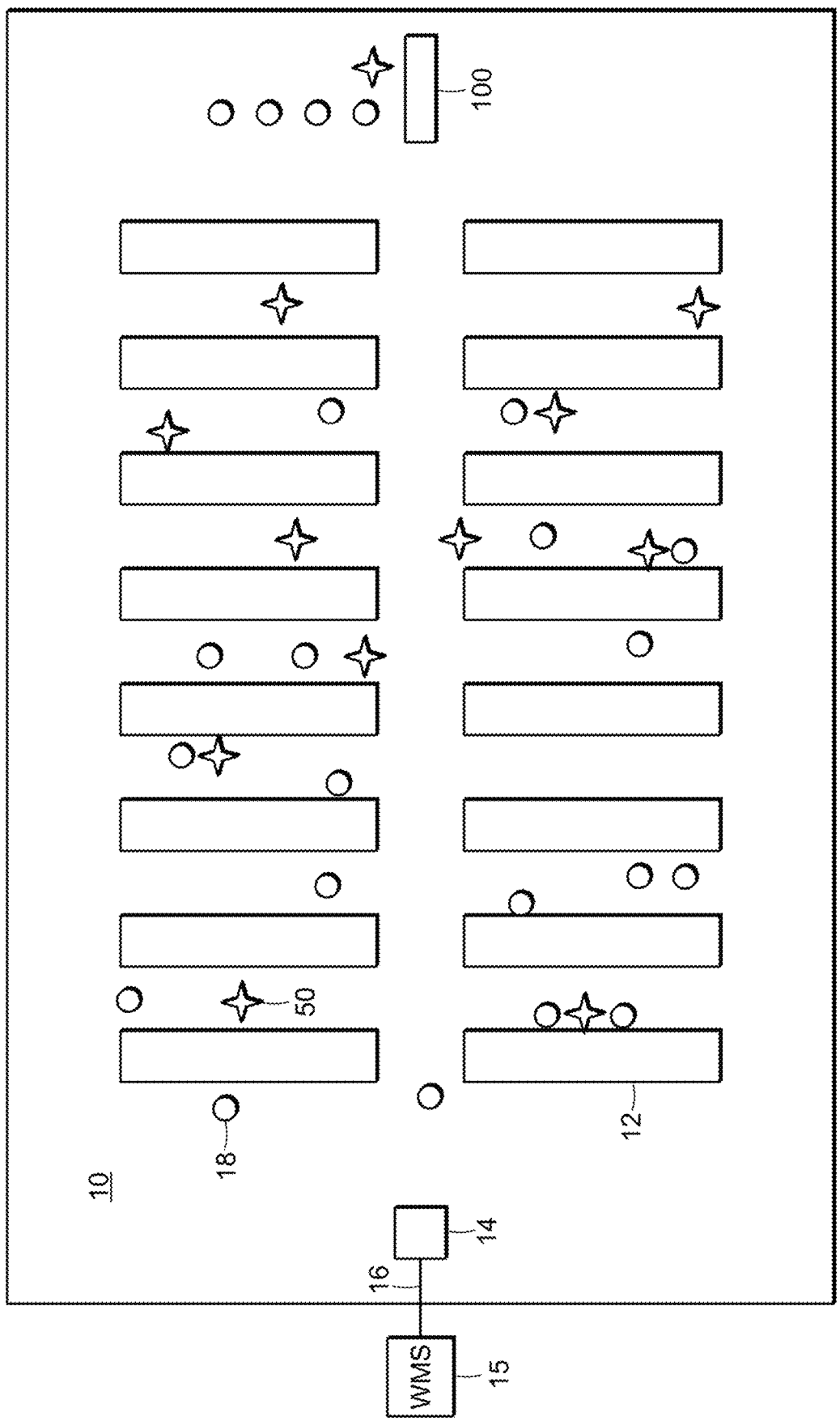
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to robot congestion management. Although not restricted to any particular robot application, one suitable application that the invention may be used in is order fulfillment. The use of robots in this application will be described to provide context for robot congestion management but is not limited to that application.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management server 15.

Figure 2A:
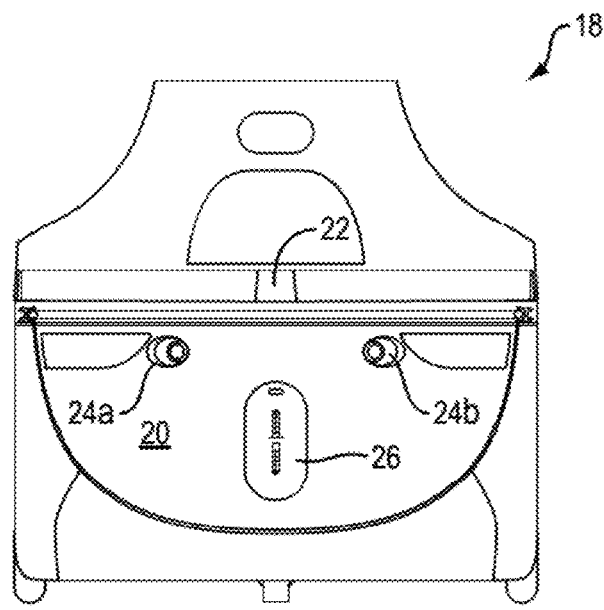
FIG. 2A is a front elevational view of a base of one of the robots used in the warehouse shown in FIG. 1.
Figure 2B:
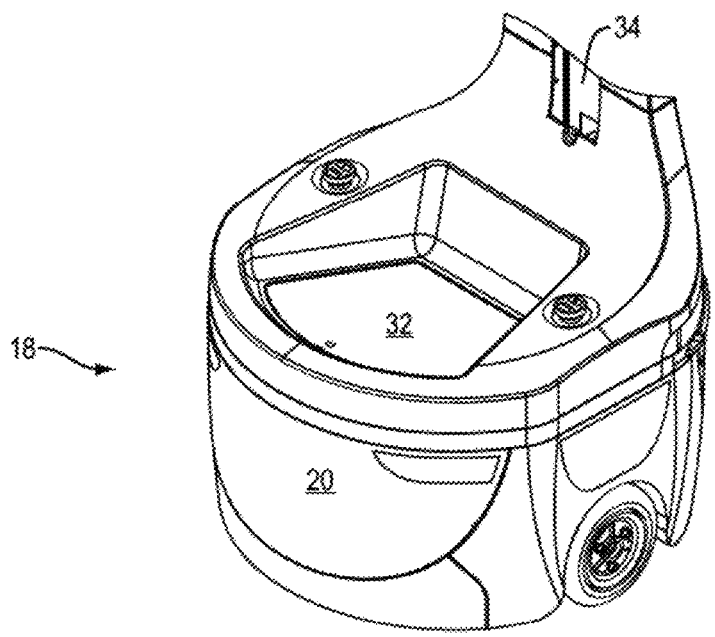
FIG. 2B is a perspective view of a base of one of the robots used in the warehouse shown in FIG. 1.
Figure 3:
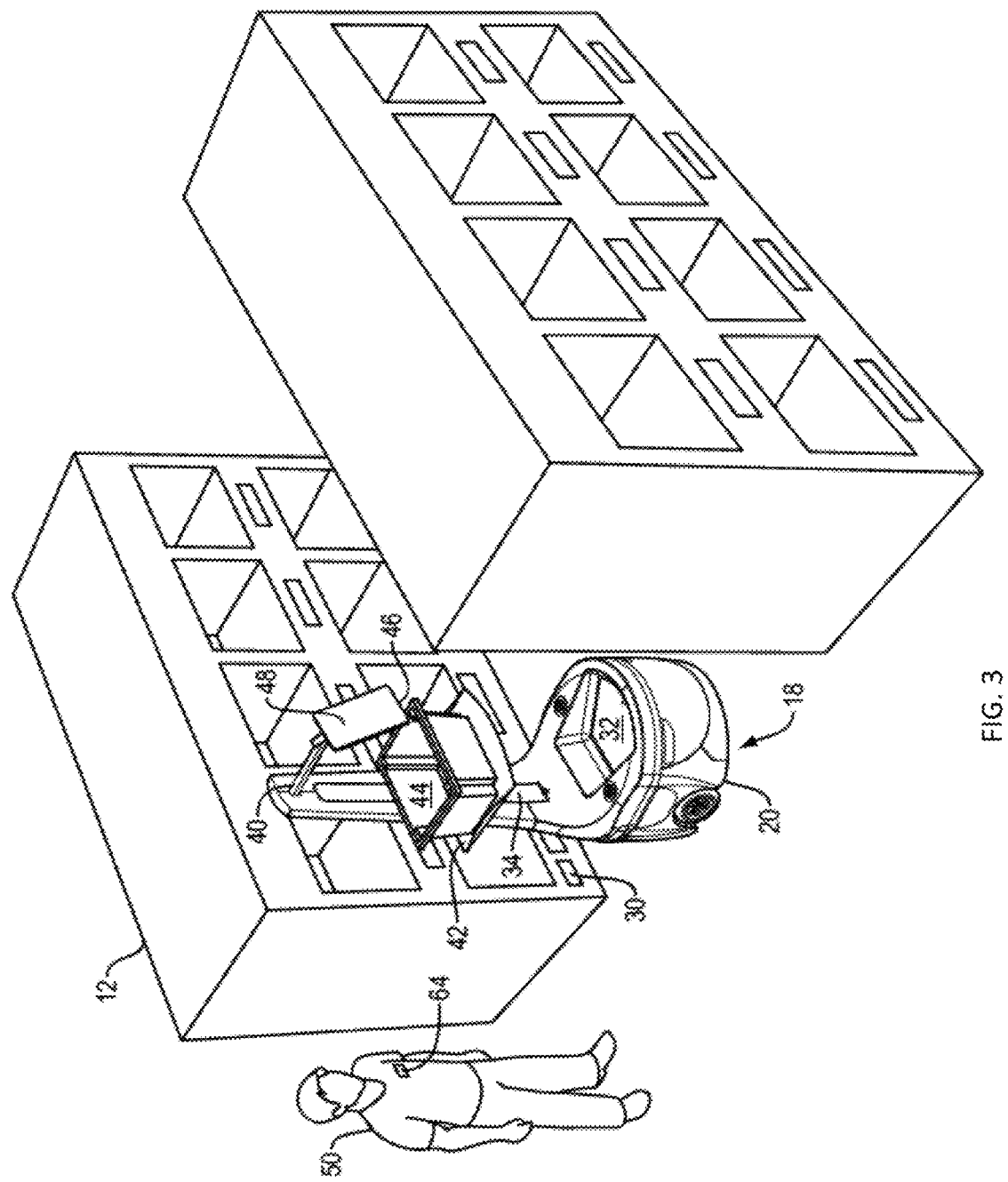
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for recharging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The baseline navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
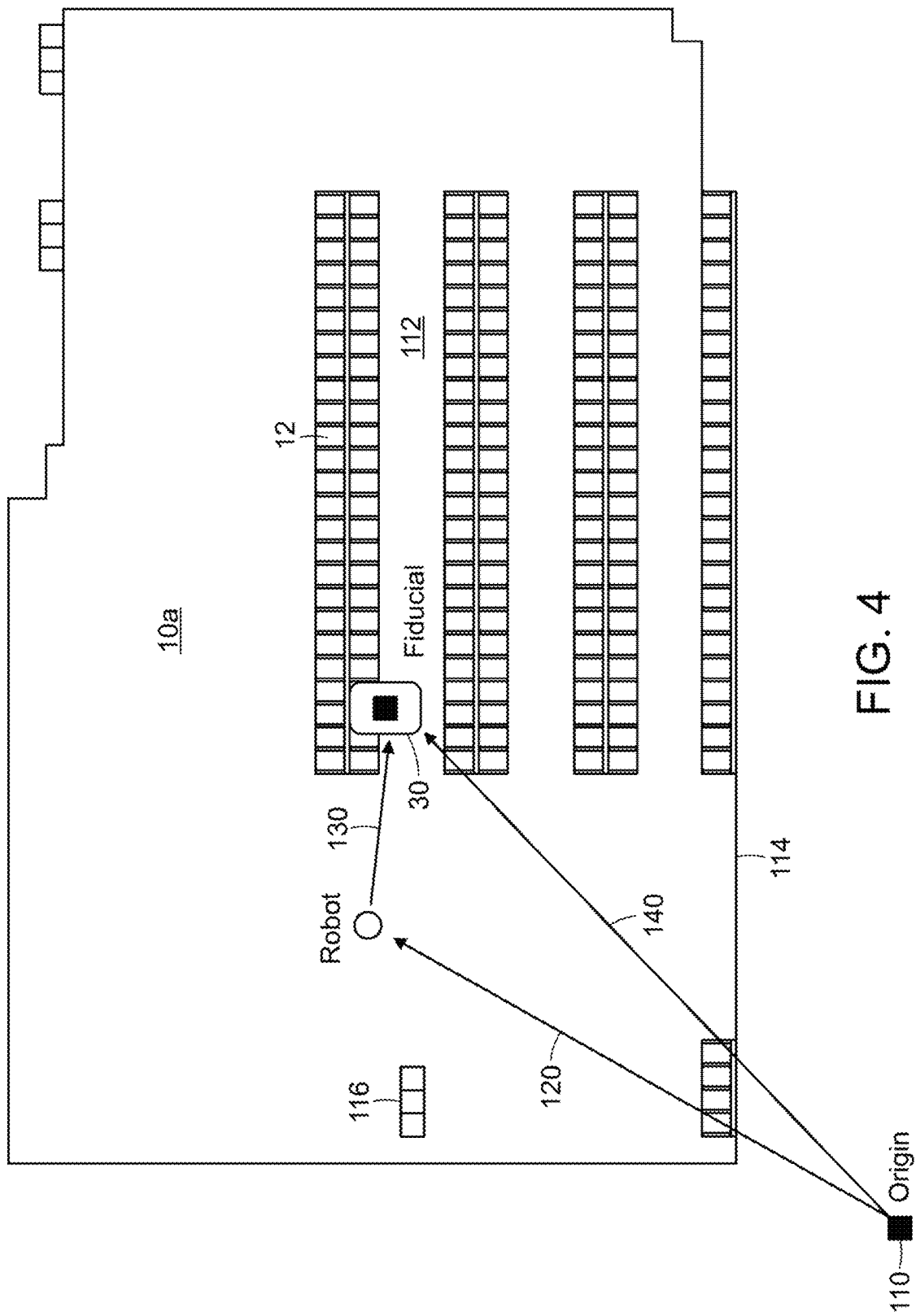
FIG. 4 is a partial map of the warehouse of FIG. 1 created using laser radar on the robot.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
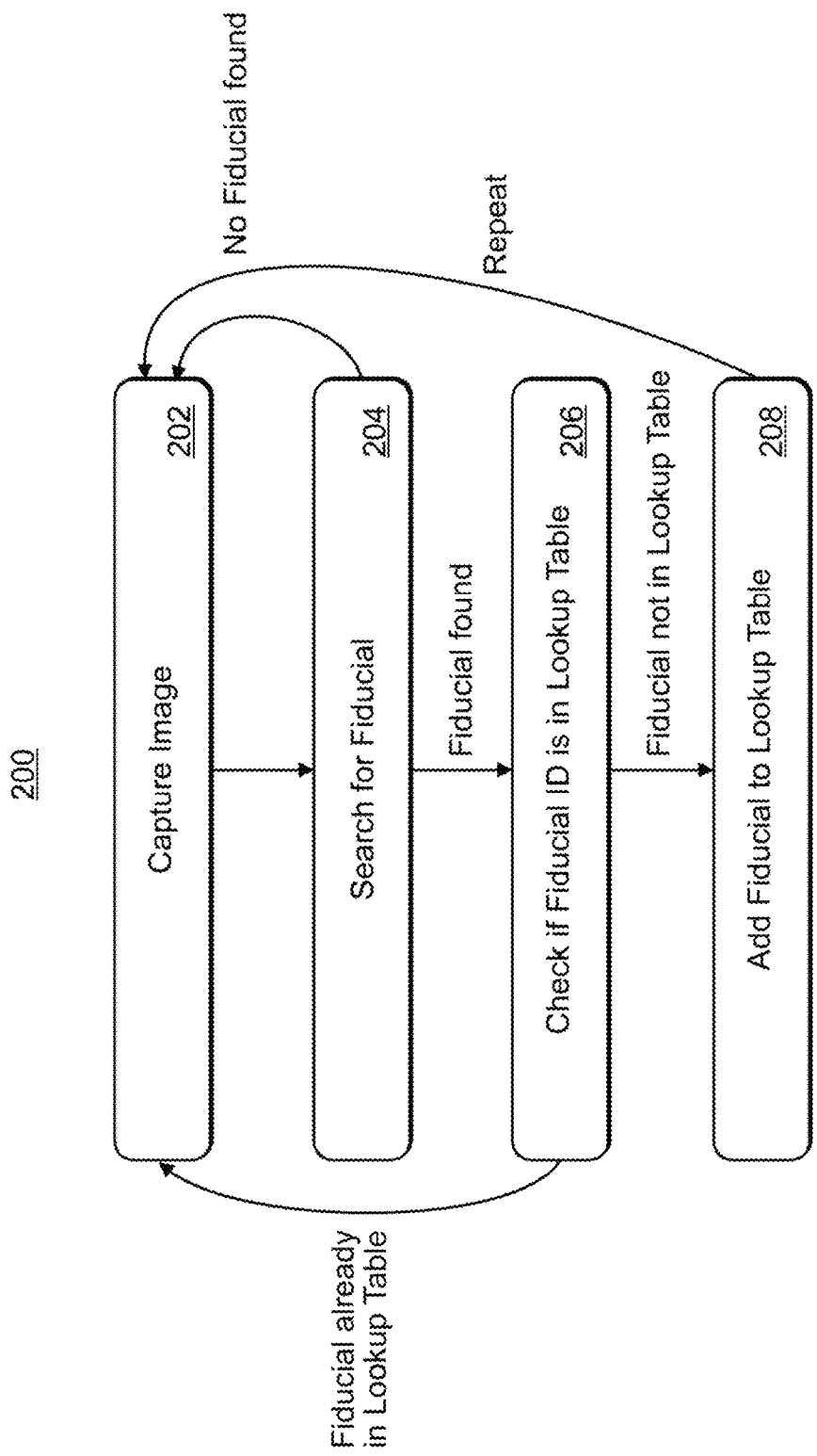
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402*a-f*) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose, as described herein.

Figure 8:
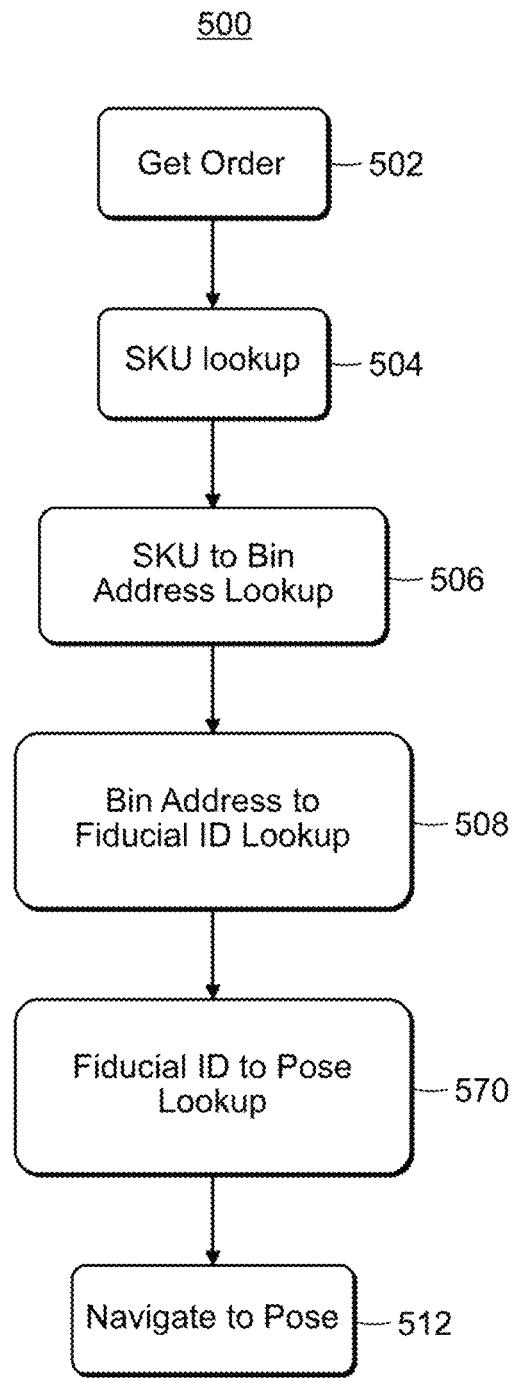
FIG. 8 is a flow chart depicting product SKU to pose mapping process.

The order fulfillment process according to this invention is depicted in flow chart 500, FIG. 8. In step 502, from warehouse management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Robot Congestion Management

As described above, a problem that can arise with a plurality of robots 18 and human operators 50 concurrently navigating through shared spaces in a navigational space is that multiple robots, as well as human operators seeking to assist them, can approach a similar location, causing both robot and human traffic congestion. For example, during an order fulfillment operation, a popular consumer item may cause robots 18 to converge on a common location or aisle, creating congestion, causing inefficient delays, and increasing collision risk.

In order to mitigate robot 18 driven congestion, described herein are systems and methods for robot congestion management. In particular, as shown in FIG. 9, a robot monitoring server 902 can track the robots 18 within the navigational space such that any robots 18 scheduled to execute an operation in a congested area can responsively redirect to an operation in an alternative location.

Figure 9:
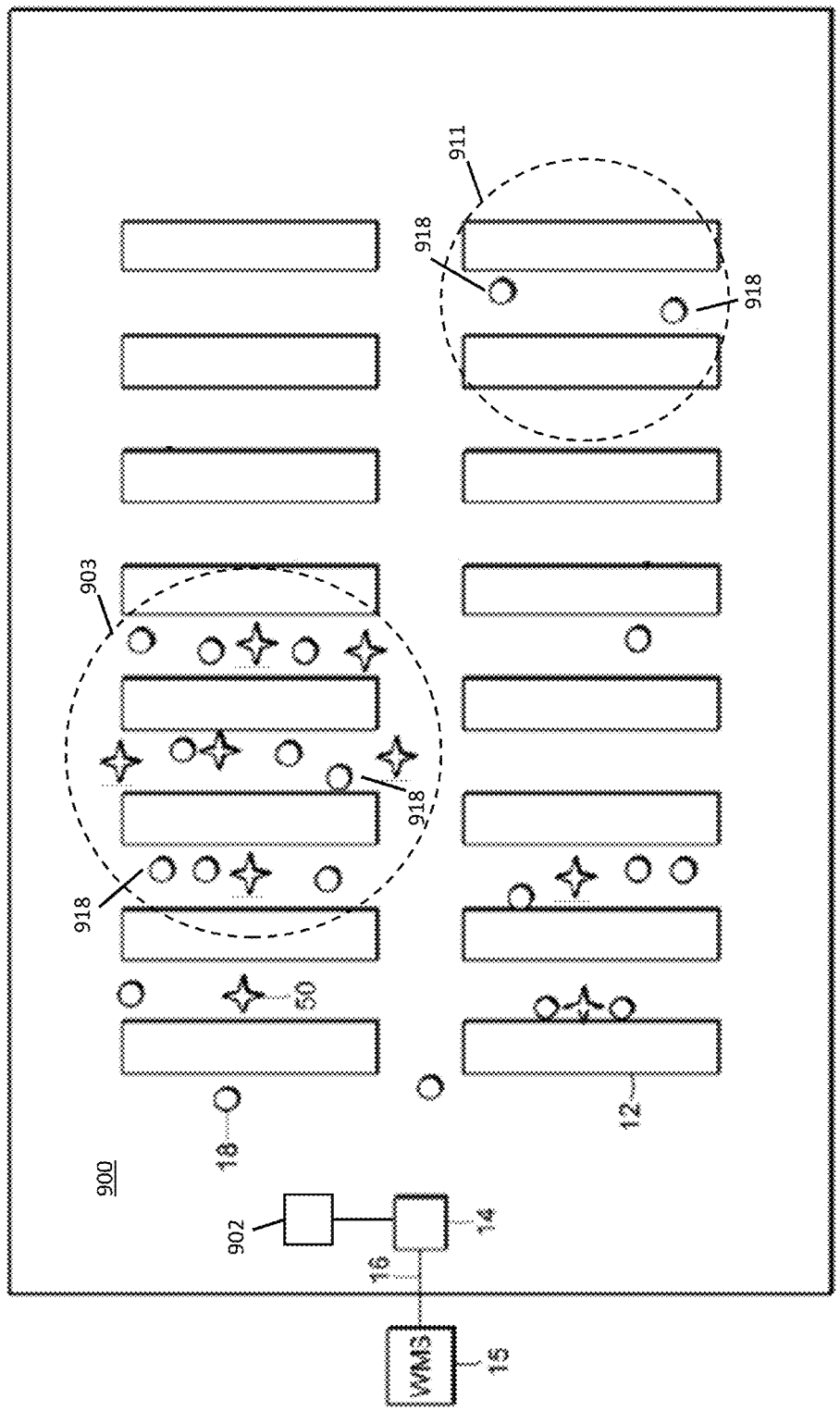
FIG. 9 map of robot and human activity within a warehouse.

FIG. 9 is a map illustrating a current state of robot 18 and human operator 50 activity within a navigational space 900. As shown in FIG. 9, there is a high concentration of robots 18 and operators 50 conglomerated in a congested area 903 within the navigational space. Such congestion can occur where, for example, a popular consumer item may cause robots executing order fulfillment tasks to converge on a common location or aisle.

Generally speaking, in some circumstances, efficiency can be increased by clustering more than one robot 18 in a particular area because it permits human operators 50 to efficiently perform multiple tasks while minimizing walking distance between robots 18. However, where the cluster becomes too concentrated, a congested area 903 can form. The congestion can cause human operators 50 and robots 18 to impede passage and travel speed of other human operators 50 and robots 18, thereby causing inefficient delays, and increasing collision risk.

In order to manage such congestion, as shown in FIG. 9, each robot 18 seeking to enter and/or navigate further within the congested area can be rerouted by a congestion management system. In general, to the extent that each robot 18 is operating within the navigational space, it can be operating to fulfill one or more tasks of an ordered task list. To the extent that the order of the task list is prescribed, it will generally dictate a pre-determined route, which can subsequently be adjusted based on congestion and/or other external factors. With respect to such an ordered task list, the robot 18 may, for example, be operating to fulfill a pick list in a particular order as assigned to the robot 18 by the warehouse management system 15 or order-server 14. Continuing the example of a popular consumer item causing the congestion, it is likely that the pick list assigned to the robot 18 may include the popular consumer item, which may be associated, for example, with a first pose location.

In some embodiments, the robot can determine the first pose location associated with the next task of the task list and then receive congestion information associated with a current state of the navigational space from a robot monitoring server 902. The robot monitoring server 902 can be any server or computing device capable of tracking robot and/or human operator activity within the warehouse, including, for example, the warehouse management system 15, the order-server 14, a standalone server, a network of servers, a cloud, a processor and memory of the robot tablet 48, the processor and memory of the base 20 of the robot 18, a distributed system comprising the memories and processors of at least two of the robot tablets 48 and/or bases 20. In some embodiments, the congestion information can be pushed automatically from the robot monitoring server 902 to the robot 18. In other embodiments, the congestion information can be sent responsive to a request from the robot 18.

Upon receipt of the congestion information, the robot 18 can compare the congestion/state information with the first pose location to identify whether the first pose location is in a congested state (i.e. positioned in a congested area 903). Any metrics or combination of metrics can be used to describe congestion conditions within the navigational space as indicated by the congestion information. For example, in accordance with various embodiments, such metrics can include one or more of a number of other robots proximate a particular pose location, a number of human operators proximate a particular pose location, a combined number of robots and human operators proximate a particular pose location, a number of manually disabled robots proximate a particular pose location, a number and type of non-robot, non-human objects, vehicles, or other obstructions proximate a particular pose location, dimensions of the navigational space proximate a particular pose location, or combinations thereof. More generally, congestion status can be determined according to any congestion condition or combination of congestion conditions tending to indicate an available amount of navigable area and/or a density of robots 18, human operators 50, obstacles, fixtures, or combinations thereof within the navigational space or a defined portion thereof.

To extent that the congestion information indicates that the first pose location is within a congested area 903, the robot 18, using the congestion management system, can adjust the order of the task list by skipping the indicated next task associated with the first pose location and select a second task from the task list. In particular, the robot 18, via the congestion management system, can determine whether a second pose location, associated with the second task, is within a congested area 903 or not. To the extent that the second pose location is in a non-congested state (i.e. outside of any congested area 903), the robot 18 can then execute an adjusted route by navigating to the second pose location for performance of the second task. If the second pose location is in a congested state, the robot 18 can iterate with subsequent selected tasks and associated pose locations until a pose location in a non-congested state is detected.

In some embodiments, robot 18 can assess the congestion state of multiple or all of the tasks of the task list before selecting the second task such that the second task can be selected according to one or more efficiency factors in addition to congestion status. Such efficiency factors can include, for example, detection of at least one human operator proximate the second pose location, the second task being a next sequential task on the pick list, the second task being a next highest priority task on the pick list, proximity of the second task to the first task, or combinations thereof. By considering such efficiency factors, the robot 18 can improve pick efficiency by, for example, minimizing travel distance, minimizing travel time, minimizing likely dwell time of the robot 18 at the second pose location, avoiding obstacles or congested areas, or combinations thereof.

After the second task is selected, the robot 18, in some embodiments, can then update the task list and corresponding route to re-insert the first task associated with the first pose location such that the robot 18 will subsequently attempt to complete the reinserted first task at a later time, prior to completing the task list. Although the first task can be inserted anywhere in the list (e.g., as the next task after the selected second task is completed, as the last task on the task list, or anywhere in between), in some embodiments, it may be advantageous to reinsert the first task in such a way as to minimize travel time or distance associated with completion of the updated task list. Additionally, reinserting the first task with a buffer of one or more additional tasks between the second task and the reinserted first task may be desirable to provide time for the congested area 903 to become less congested. Similarly, the robot 18 may estimate a reinsertion position for the first task that will cause the reinserted first task to be executed at a time when traffic in the congested area 903 is likely to be less dense.

Thus, the congestion management system can advantageously reduce congestion within a navigational space, lower collision risk, and prevent inefficient delays robot task completion.

Non-Limiting Example Computing Devices

Figure 10:
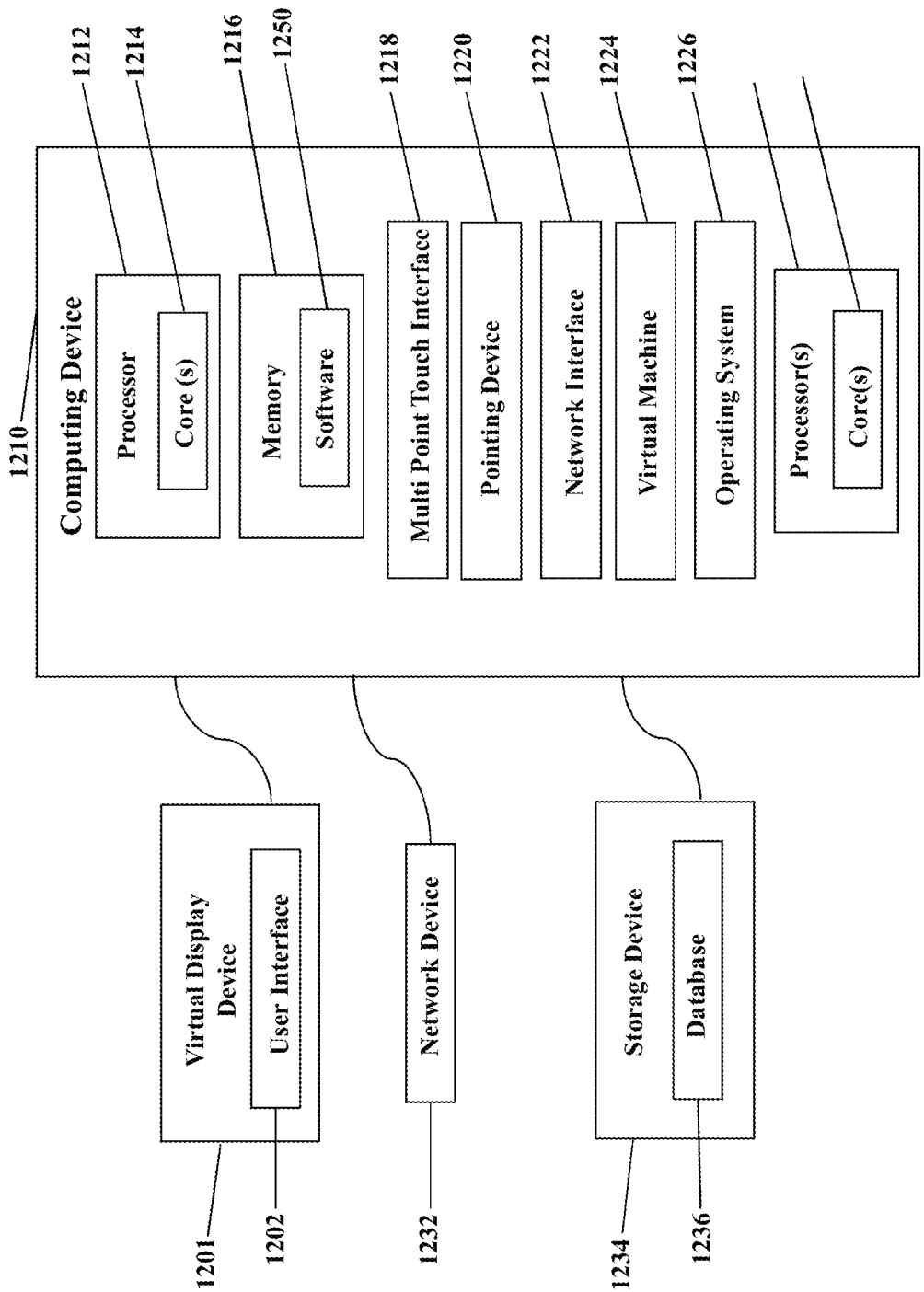
FIG. 10 is a block diagram of an exemplary computing system.

FIG. 10 is a block diagram of an exemplary computing device 1210 such as can be used, or portions thereof, in accordance with various embodiments as described above with reference to FIGS. 1-9. The computing device 1210 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1216 included in the computing device 1210 can store computer-readable and computer-executable instructions or software for performing the operations disclosed herein. For example, the memory can store software application 1240 which is programmed to perform various of the disclosed operations as discussed with respect to FIGS. 1-9. The computing device 1210 can also include configurable and/or programmable processor 1212 and associated core 1214, and optionally, one or more additional configurable and/or programmable processing devices, e.g., processor(s) 1212' and associated core (s) 1214' (for example, in the case of computational devices having multiple processors/cores), for executing computer-readable and computer-executable instructions or software stored in the memory 1216 and other programs for controlling system hardware. Processor 1212 and processor(s) 1212' can each be a single core processor or multiple core (1214 and 1214') processor.

Virtualization can be employed in the computing device 1210 so that infrastructure and resources in the computing device can be shared dynamically. A virtual machine 1224 can be provided to handle a process running on multiple processors so that the process appears to be using only one computing resource rather than multiple computing resources. Multiple virtual machines can also be used with one processor.

Memory 1216 can include a computational device memory or random access memory, such as but not limited to DRAM, SRAM, EDO RAM, and the like. Memory 1216 can include other types of memory as well, or combinations thereof.

A user can interact with the computing device 1210 through a visual display device 1201, 111A-D, such as a computer monitor, which can display one or more user interfaces 1202 that can be provided in accordance with exemplary embodiments. The computing device 1210 can include other I/O devices for receiving input from a user, for example, a keyboard or any suitable multi-point touch interface 1218, a pointing device 1220 (e.g., a mouse). The keyboard 1218 and the pointing device 1220 can be coupled to the visual display device 1201. The computing device 1210 can include other suitable conventional I/O peripherals.

The computing device 1210 can also include one or more storage devices 1234, such as but not limited to a hard-drive, CD-ROM, or other computer readable media, for storing data and computer-readable instructions and/or software that perform operations disclosed herein. Exemplary storage device 1234 can also store one or more databases for storing any suitable information required to implement exemplary embodiments. The databases can be updated manually or automatically at any suitable time to add, delete, and/or update one or more items in the databases.

The computing device 1210 can include a network interface 1222 configured to interface via one or more network devices 1232 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1222 can include a built-in network adapter, network interface card, PCMCIA network card, card bus network adapter, wireless network adapter, USB network adapter, modem or any other device suitable for interfacing the computing device 1210 to any type of network capable of communication and performing the operations described herein. Moreover, the computing device 1210 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1210 can run any operating system 1226, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1226 can be run in native mode or emulated mode. In an exemplary embodiment, the operating system 1226 can be run on one or more cloud machine instances.

Figure 11:
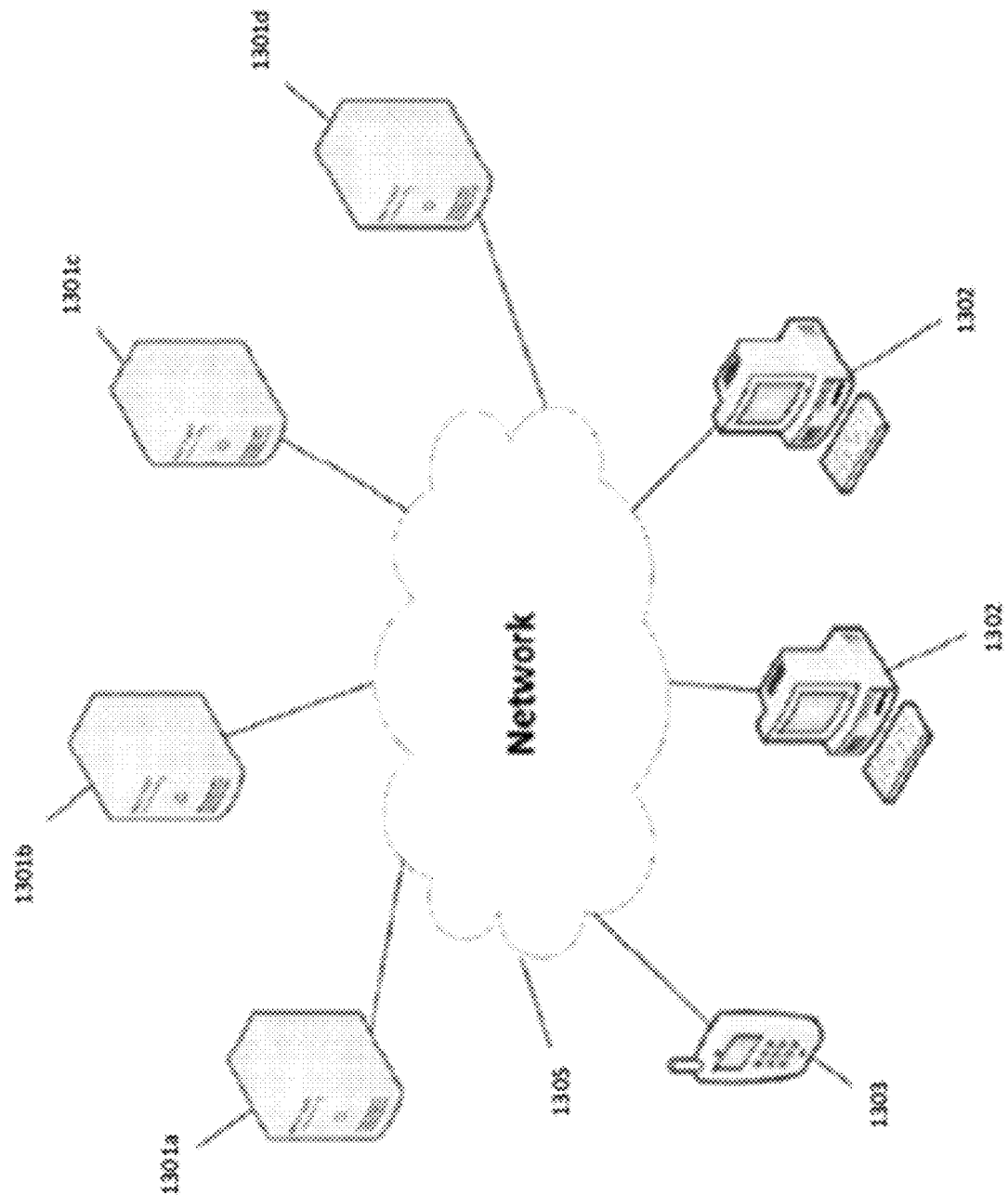
FIG. 11 is a network diagram of an exemplary distributed network.

FIG. 11 is an example computational device block diagram of certain distributed embodiments. Although FIGS. 1-10, and portions of the exemplary discussion above, make reference to a warehouse management system 15, order-server 14, or robot tracking server 902 each operating on an individual or common computing device, one will recognize that any one of the warehouse management system 15, the order-server 14, or the robot tracking server 902 may instead be distributed across a network 1305 in separate server systems 1301*a-d* and possibly in user systems, such as kiosk, desktop computer device 1302, or mobile computer device 1303. For example, the order-server 14 may be distributed amongst the tablets 48 of the robots 18. In some distributed systems, modules of any one or more of the warehouse management system software and/or the order-server software can be separately located on server systems 1301*a-d* and can be in communication with one another across the network 1305.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by letters patent is:

1. A robot congestion management system comprising:
   a robot monitoring server configured to track a location of a plurality of robots and a plurality of human operators within a navigational space; and
   the plurality of robots in communication with the robot monitoring server, each robot configured to perform a plurality of tasks with the assistance of a human operator of the plurality of human operators, wherein each task includes at least one of a pick operation and a put operation, each robot including:
   a processor; and
   a memory, the memory storing instructions that, when executed by the processor, cause the autonomous robot to:
   determine, from a task list assigned to the robot, a first pose location (x, y, z, ω) corresponding to a first task,
   receive, from the robot monitoring server, congestion information in a predefined area about the first pose location, wherein the congestion information includes an integer number of other robots, an integer number of human operators, or a combined integer number of robots and human operators currently present in the predefined area about the first pose location, determine, based on the congestion information, if the predefined area about the first pose location is in a congested state, wherein the predefined area about the first pose location is in a congested state if the integer number of other robots, the integer number of human operators, or the combined integer number of robots and human operators currently present exceeds a threshold, the threshold being an integer greater than two, select a second pose location $(x, y, z, \omega)$ corresponding to a second task from the task list, the second pose location being selected responsive to the determination of a congested state in the predefined area about the first pose location and responsive to a plurality of efficiency factors regarding the second pose location, including the second pose location is not currently in a congested state and at least one human operator is currently detected proximate the second pose location, and navigate to the second pose location.

* * * * *